US012645337B2

(12) United States Patent
Yoshida

(10) Patent No.: US 12,645,337 B2
(45) Date of Patent: Jun. 2, 2026

(54) APPARATUS AND METHOD FOR ASSOCIATING PRINTING JOB USING MANAGEMENT CODE

(71) Applicant: Eiichiro Yoshida, Kanagawa (JP)

(72) Inventor: Eiichiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 491 days.

(21) Appl. No.: 17/805,286

(22) Filed: Jun. 3, 2022

(65) Prior Publication Data

US 2022/0391247 A1 Dec. 8, 2022

(30) Foreign Application Priority Data

Jun. 7, 2021 (JP) ................................. 2021-095065

(51) Int. Cl.
*G06F 3/0481* (2022.01)
*G06F 3/04847* (2022.01)
*G06F 21/44* (2013.01)

(52) U.S. Cl.
CPC ........ *G06F 3/0481* (2013.01); *G06F 3/04847* (2013.01); *G06F 21/44* (2013.01)

(58) Field of Classification Search
None
See application file for complete search history.

(56) References Cited

U.S. PATENT DOCUMENTS 10,037,483 B2 * 7/2018 Hayashi ................ G06F 3/1238
2005/0243366 A1 * 11/2005 Fukuda .................. G06Q 10/06
358/1.15

2008/0037057 A1 * 2/2008 Caffary, Jr. ............. G06F 15/00
358/1.15
2008/0106755 A1 * 5/2008 Morooka ................ G06F 3/127
358/1.15
2009/0268221 A1 * 10/2009 Hirahara ............... G06F 3/1238
358/1.9
2010/0325177 A1 12/2010 Hibino et al.
2013/0229674 A1 9/2013 Akutsu
2017/0070640 A1 * 3/2017 Kondoh ............. H04N 1/00344
2017/0308335 A1 * 10/2017 Keane ................... G06F 3/1262
2021/0092241 A1 3/2021 Yoshida et al.

FOREIGN PATENT DOCUMENTS

EP        2634732        9/2013
JP     2004-178324       6/2004
JP     2007-193695       8/2007
(Continued)

OTHER PUBLICATIONS

Japanese Office Action for 2021-095065 mailed on Nov. 19, 2024.
(Continued)

*Primary Examiner* — Mandrita Brahmachari

(74) *Attorney, Agent, or Firm* — IPUSA, PLLC

(57) ABSTRACT

An information processing apparatus includes circuitry; and a memory storing computer-executable instructions that cause the circuitry to execute receiving input of identification information for identifying a subject requesting execution of a service; and displaying, on a display, an input screen for inputting a management code associated with log information indicating execution history of a job, based on the identification information.

11 Claims, 10 Drawing Sheets

(56) References Cited

FOREIGN PATENT DOCUMENTS

| | | |
|---|---|---|
| JP | 2008-077394 | 4/2008 |
| JP | 2011-004087 | 1/2011 |
| JP | 2013-210995 | 10/2013 |
| JP | 2014-178802 | 9/2014 |
| JP | 2019-159715 | 9/2019 |

OTHER PUBLICATIONS

Extended European Search Report for 22177407.8 mailed on Nov. 2, 2022.
European Office Action for 22177407.8 mailed on Jan. 12, 2026.

\* cited by examiner

100

MANAGEMENT SERVER    300

CODE MANAGEMENT DB    320

DISPLAY SETTING DB    330

LOG DB    340

MANAGEMENT PROCESSING UNIT    350

AUTHENTICATION SERVER    400

INFORMATION PROCESSING APPARATUS    200

| TENANT ID=101 | |
|---|---|
| BUSINESS PARTNER NAME | MANAGEMENT CODE |
| COMPANY A | 1234 |
| COMPANY B | 5678 |

| TENANT ID=101 | |
|---|---|
| DISPLAY/HIDE | INPUT METHOD |
| DISPLAY METHOD | INPUT HISTORY |

| TENANT ID=101 | |
|---|---|
| MANAGEMENT CODE | NUMBER OF OUTPUT SHEETS |
| 1234 | 20 SHEETS |
| 5678 | 100 SHEETS |

APPARATUS AND METHOD FOR ASSOCIATING PRINTING JOB USING MANAGEMENT CODE

CROSS-REFERENCE TO RELATED APPLICATION

The present application is based on and claims priority under 35 U.S.C. § 119 to Japanese Patent Application No. 2021-095065, filed on Jun. 7, 2021, the contents of which are incorporated herein by reference in their entirety.

BACKGROUND OF THE INVENTION

1. Field of the Invention

The present invention relates to an information processing apparatus, an information processing method, and a recording medium.

2. Description of the Related Art

Conventionally, a technique of aggregating the usage status of a printing apparatus for each management code by associating the job information with the management code when printing by the printing apparatus, is known. Specifically, conventionally, for example, a technique of displaying a pop up of an input dialog of the management code when a print instruction is issued, and selecting the management code from a list of the registered management codes, is known.

Patent Document 1: Japanese Unexamined Patent Application Publication No. 2004-178324

SUMMARY OF THE INVENTION

According to one aspect of the present invention, there is provided an information processing apparatus including circuitry; and a memory storing computer-executable instructions that cause the circuitry to execute receiving input of identification information for identifying a subject requesting execution of a service; and displaying, on a display, an input screen for inputting a management code associated with log information indicating execution history of a job, based on the identification information.

BRIEF DESCRIPTION OF THE DRAWINGS

FIG. 4 is a diagram illustrating an example of a code management database according to an embodiment of the present invention;

FIG. 5 is a diagram illustrating an example of a display setting database according to an embodiment of the present invention;

FIG. 6 is a diagram illustrating an example of a log database according to an embodiment of the present invention;

DESCRIPTION OF THE EMBODIMENTS

The conventional technology described above requires a management code to be input each time a user gives a print instruction, and the input operation is complicated.

A problem to be addressed by an embodiment of the present invention is to simplify the input operation.

Figure 1:
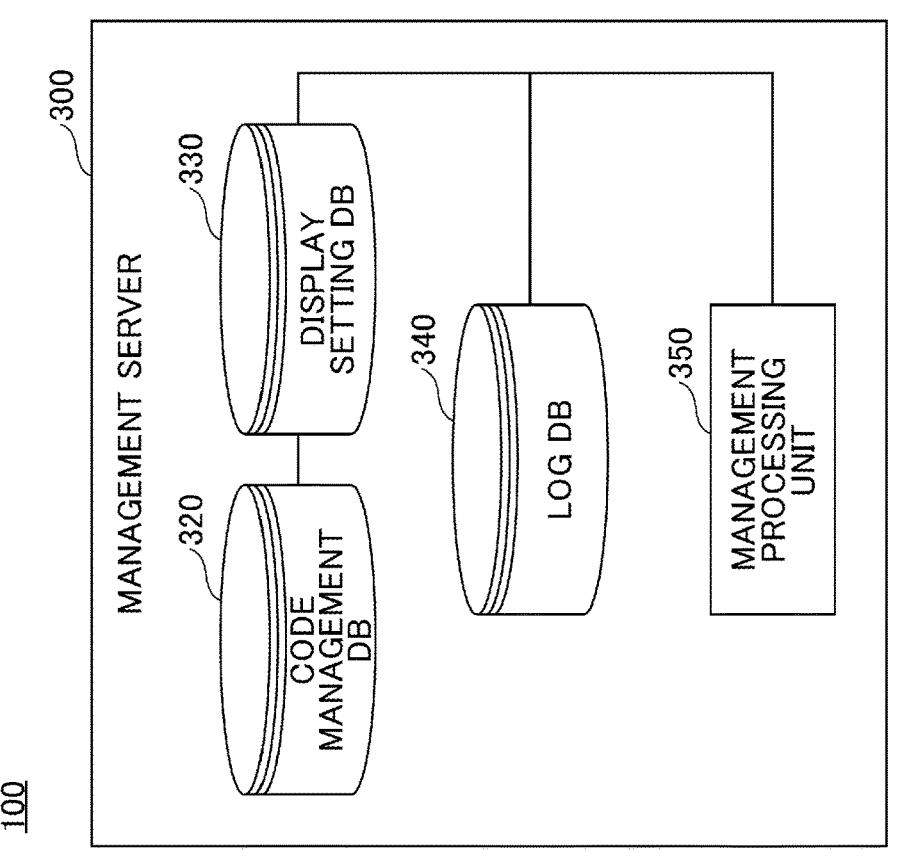
FIG. 1 is a diagram illustrating an example of a system configuration of an information processing system according to an embodiment of the present invention.
Figure 1:
Figure 1:
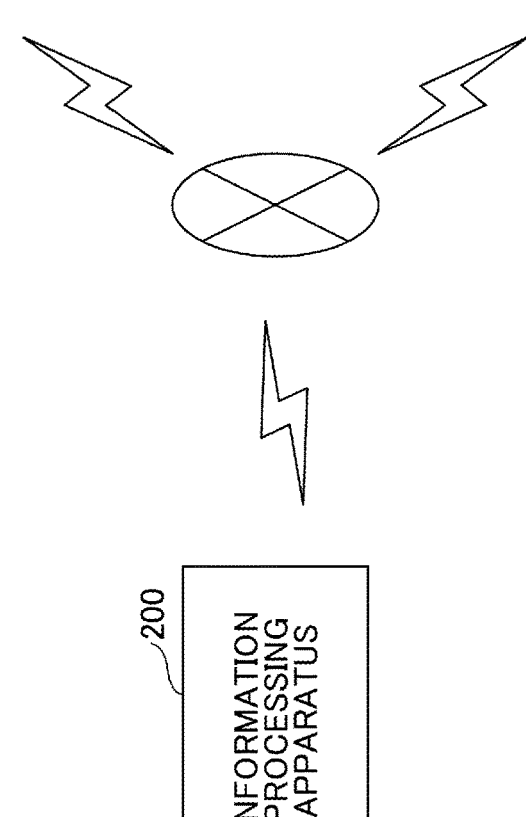

Hereinafter, the present embodiment will be described with reference to the drawings. FIG. 1 is a diagram illustrating an example of a system configuration of an information processing system.

An information processing system 100 according to the present embodiment includes an information processing apparatus 200, a management server 300, and an authentication server 400, which are connected to each other via a network.

The information processing apparatus 200 according to the present embodiment is, for example, an image forming apparatus. Upon receiving input of the authentication information of the user, the information processing apparatus 200 transmits an authentication request to the authentication server 400. When the user is authenticated, the information processing apparatus 200 refers to the management server 300 and displays a screen for inputting a management code according to the display setting of the management code associated with the authentication information. When the management code is input, the information processing apparatus 200 assigns the management code to a job executed thereafter and transmits the management code as the log information of the information processing apparatus 200 to the management server 300.

The management server 300 includes a code management database (DB) 320, a display setting database 330, a log database 340, and a management processing unit 350.

The code management database 320 stores code management information in which identification information for identifying a tenant using the information processing apparatus 200 and the management code used by the tenant are associated with each other.

The tenant of the present embodiment is, for example, a business office, a company, or an organization that has made a contract for using the services provided by the information processing system 100 according to the present embodiment, and is a unit used for managing the organization that has made the contract for the services, for example.

The services provided by the information processing system 100 are used, for example, by a user belonging to a tenant (a user belonging to an organization that is a tenant)

or a device belonging to a tenant. That is, the tenant, the user belonging to the tenant (the user belonging to the organization that is the tenant), or the device belonging to the tenant are the subjects that use the services provided by the information processing system 100 and are the subjects that request the execution of the services provided by the information processing system 100. The information processing system 100 may have a database for managing a user or a device belonging to a tenant in association with the services available for use, for each of a plurality of tenants.

The services provided by the information processing system 100 include the functions included in the information processing apparatus 200 and the functions provided by an external server accessible by the information processing apparatus 200. More specifically, the services include functions provided by an application installed in the information processing apparatus 200 and functions provided via a web browser of the information processing apparatus 200 by an application installed in an external server.

The management code used by a tenant is the identification information that identifies the organization such as a company, or, identifies an individual or the like, which is a business partner of the tenant identified by the identification information.

The display setting database 330 stores display setting information indicating the display setting relating to the management code of each tenant.

In the log database 340, the log information transmitted from the information processing apparatus 200 is stored for each tenant. The log information is information representing the execution history of a job in the information processing apparatus 200.

The code management information stored in the code management database 320 according to the present embodiment and the display setting information stored in the display setting database 330 may be input in advance by, for example, an administrative terminal connected to the management server 300 via the network.

When the identification information of the tenant included in the authentication information is received from the information processing apparatus 200, the management processing unit 350 according to the present embodiment transmits code management information corresponding to the identification information to the information processing apparatus 200. When the log information is received from the information processing apparatus 200, the management processing unit 350 stores the log information for each tenant.

When the authentication server 400 receives an authentication request from the information processing apparatus 200, the authentication server 400 performs authentication. Specifically, the authentication server 400 previously stores the user information of the information processing system 100, and when the authentication information, which is received together with an authentication request from the information processing apparatus 200, is included in the user information, the authentication server 400 authenticates the user indicated by the authentication information. The authentication server stores tenant information or device information, and when the authentication information, which is received together with an authentication request from the information processing apparatus 200, is included in the tenant information or device information, the authentication server 400 authenticates the tenant or device indicated by the authentication information.

In the example illustrated in FIG. 1, the management server 300 and the authentication server 400 are separate devices, but are not limited thereto. For example, the management server 300 may also serve as the authentication server 400.

In the example of FIG. 1, the management server 300 includes the code management database 320, the display setting database 330, and the log database 340, but the present embodiment is not limited thereto. Each database may be provided, in whole or in part, in an external device. The management server 300 may be implemented by a plurality of information processing apparatuses. In this case, the function of the management processing unit 350 may be implemented by a plurality of information processing apparatuses.

Hereinafter, the hardware configuration of each apparatus of the information processing system 100 will be described with reference to FIGS. 2 and 3.

Figure 2:
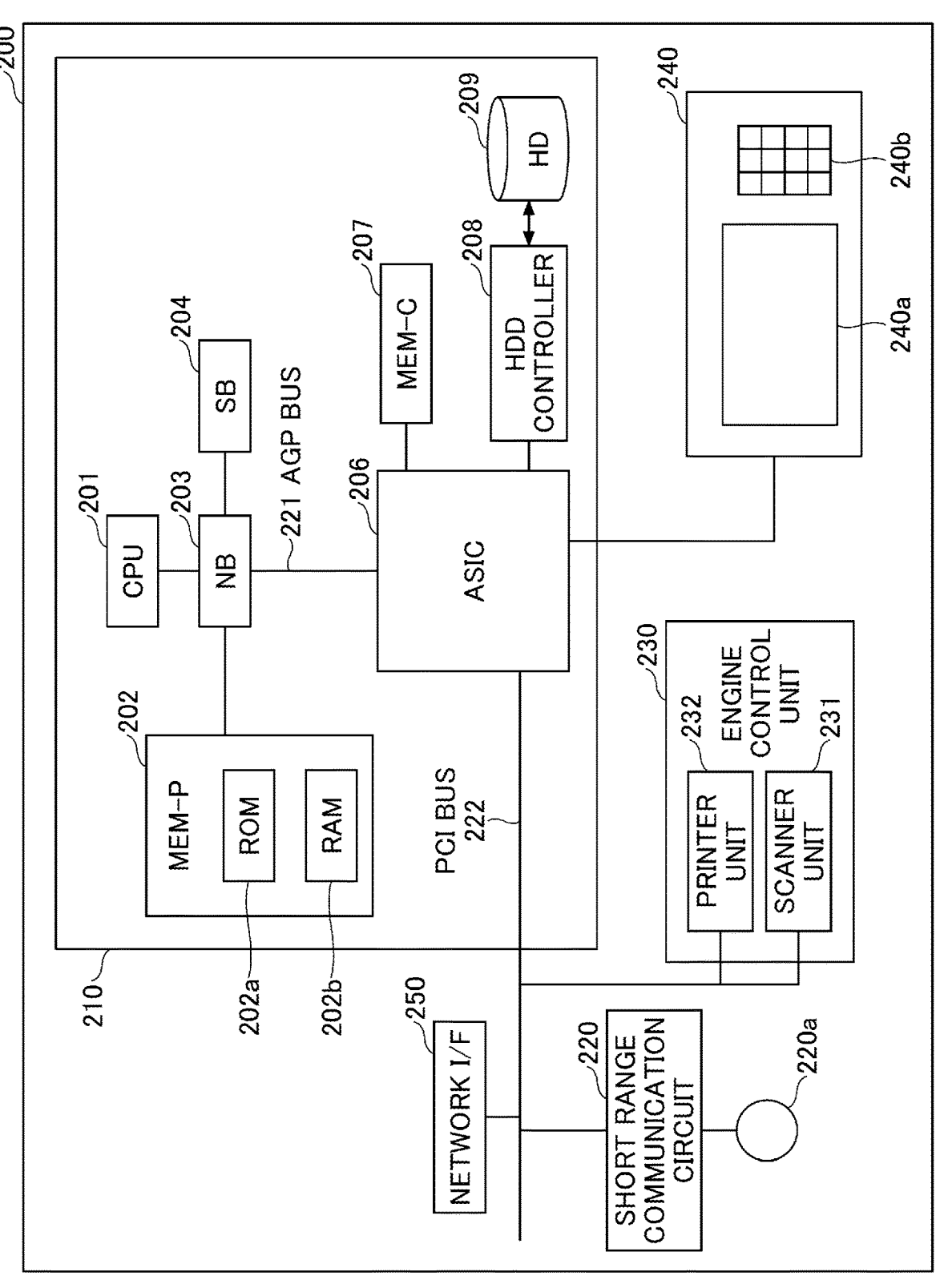
FIG. 2 is a hardware configuration diagram of an information processing apparatus according to an embodiment of the present invention.

FIG. 2 is a hardware configuration diagram illustrating an information processing apparatus. The information processing apparatus 200 according to the present embodiment is, for example, an image forming apparatus and includes a controller 210, a short range communication circuit 220, an engine control unit 230, an operation panel 240, and a network interface (I/F) 250.

Among these, the controller 210 includes a central processing unit (CPU) 201, a system memory (MEM-P) 202, a north bridge (NB) 203, a south bridge (SB) 204, an Application Specific Integrated Circuit (ASIC) 206, a local memory (MEM-C) 207 as a storage unit, a hard disk drive (HDD) controller 208, and a HD 209 as a storage unit, that are the main parts of a computer, and the controller 210 is configured such that the NB 203 and the ASIC 206 are connected to each other by an Accelerated Graphics Port (AGP) bus 221.

Among these, the CPU 201 is a control unit that performs overall control of the information processing apparatus 200. The NB 203 is a bridge for connecting the CPU 201 with each of the MEM-P 202, the SB 204, and the AGP bus 221, and has a memory controller for controlling reading and writing from and to the MEM-P 202, a Peripheral Component Interconnect (PCI) master, and an AGP target.

The MEM-P 202 includes the read-only memory (ROM) 202*a*, which is a memory for storing programs and data for implementing each function of the controller 210, and a random access memory (RAM) 202*b*, which is used for loading programs and data, as well as a rendering memory at the time of memory printing. The program stored in the RAM 202*b* may be configured to be provided by being recorded in a computer-readable recording medium such as a compact disc read-only memory (CD-ROM), a CD recordable (CD-R), or a digital versatile disc (DVD) in a file in an installable format or an executable format.

The SB 204 is a bridge for connecting the NB 203 to PCI devices and peripheral devices. The ASIC 206 is an integrated circuit (IC) for image processing applications having hardware elements for image processing, and serves as a bridge connecting the AGP bus 221, the PCI bus 222, the HDD controller 208, and the MEM-C 207. The ASIC 206 includes a PCI target and AGP master, an arbiter (ARB) that forms the core of the ASIC 206, a memory controller that controls the MEM-C 207, a plurality of Direct Memory Access Controllers (DMACs) that rotates image data by hardware logic, etc., and a PCI unit that performs data transfer between a scanner unit 231 and a printer unit 232 via the PCI bus 222. The ASIC 206 may be connected to an interface of the Universal Serial Bus (USB) or an interface of the IEEE 1394 (Institute of Electronic and Electronic Engineers 1394).

The MEM-C 207 is a local memory used as an image buffer and a code buffer for copying. The HD 209 is a storage device for storing image data, storing font data used for printing, and storing forms. The HD 209 controls the reading or writing of data from or to the HD 209 according to the control of the CPU 201. The AGP bus 221 is a bus interface for graphics accelerator cards proposed for speeding up graphics processing, and by directly accessing the MEM-P 202 with high throughput, the graphics accelerator card can be made faster.

The short range communication circuit 220 includes an antenna 220*a*. The short range communication circuit 220 is a communication circuit such as Near Field Communication (NFC), Bluetooth, or the like.

The engine control unit 230 includes the scanner unit 231 and the printer unit 232. The operation panel 240 includes a panel display unit (display unit) 240*a*, such as a touch panel, which displays a current setting value, a selection screen, or the like, and receives input from an operator, and a touch panel 240*b*, such as a numeric pad for receiving a setting value of an image forming condition, such as a density setting condition, and a start key, which receives and a copy start instruction.

The controller 210 controls the entire information processing apparatus 200 and controls, for example, rendering, communication, input from an operation panel 240, and the like. The scanner unit 231 or the printer unit 232 includes an image processing unit for performing processing such as error diffusion or gamma conversion.

The information processing apparatus 200 can select a function by sequentially switching among a document box function, a copy function, a printer function, and a facsimile function by using an application switching key of the operation panel 240. When the document box function is selected, the document box mode is set, when the copy function is selected, the copy mode is set, when the printer function is selected, the printer mode is set, and when the facsimile function is selected, the facsimile mode is set.

The network I/F 250 is an interface for performing data communication by using a communication network. The short range communication circuit 220 and the network I/F 250 are electrically connected to the ASIC 206 via the PCI bus 222.

Figure 3:
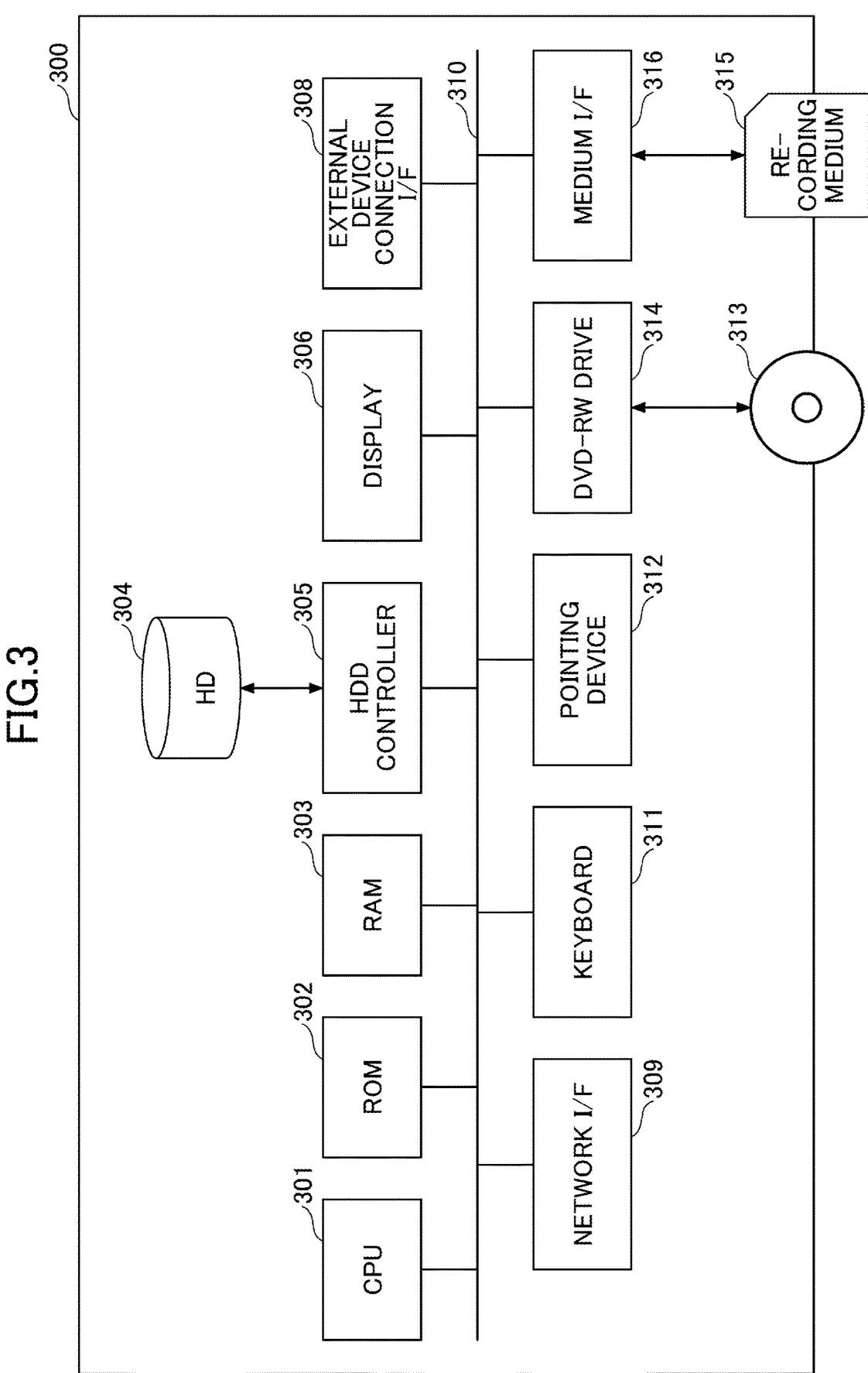
FIG. 3 is a hardware configuration diagram of a server according to an embodiment of the present invention.

FIG. 3 is a diagram illustrating the hardware configuration of a server. Here, the hardware configuration of the management server 300 will be described.

The management server 300 of the present embodiment is configured by a computer and, as illustrated in FIG. 3, includes a CPU 301, a ROM 302, a RAM 303, an HD 304, an HDD (hard disk drive) controller 305, a display 306, an external device connection I/F (interface) 308, a network I/F 309, a data bus 310, a keyboard 311, a pointing device 312, a Digital Versatile Disk Rewritable (DVD-RW) drive 314, and a medium I/F 316.

Among these, the CPU 301 controls the operation of the entire management server 300. The ROM 302 stores a program used to drive the CPU 301, such as an IPL. The RAM 303 is used as the work area of the CPU 301. The HD 304 stores various kinds of data such as a program. The HDD controller 305 controls the reading or writing of various kinds of data from or to the HD 304 according to the control of the CPU 301. The display 306 displays various kinds of information such as cursors, menus, windows, characters, or images. The external device connection I/F 308 is an interface for connecting various external devices. In this case, the external device may be, for example, a USB (Universal Serial Bus) memory or a printer. The network I/F 309 is an interface for performing data communication by using a communication network. The data bus 310 is an address bus or a data bus for electrically connecting elements such as the CPU 301 illustrated in FIG. 3.

The keyboard 311 is a type of input means having a plurality of keys for inputting characters, numbers, various instructions, and the like. The pointing device 312 is a type of input means for selecting and executing various instructions, selecting a processing target, moving a cursor, and the like. The DVD-RW drive 314 controls the reading or writing of various kinds of data from or to the DVD-RW 313 as an example of a removable recording medium. The recording medium is not limited to a DVD-RW, but may be Digital Versatile Disc Recordable (DVD-R), etc. The medium I/F 316 controls the reading or writing (storage) of data from or to a recording medium 315, such as a flash memory.

Next, each database of the management server 300 of the present embodiment will be described with reference to FIGS. 4 to 6.

FIG. 4 is a diagram illustrating an example of a code management database. The code management information stored in the code management database 320 according to the present embodiment is stored for each tenant, and information items of a tenant ID, a business partner name, and a management code are associated with each other in the information.

The value of the item "tenant ID" is the tenant identification information used to identify the organization (tenant) such as a company that is using the information processing apparatus 200. That is, the tenant ID is identification information that identifies the subject requesting the execution of the service provided by the information processing system 100.

The value of the item "business partner name" indicates the name of the business partner of the tenant identified by the tenant ID. A business partner may be, for example, a company or an organization that outsources business to the tenant. That is, the business partner is, for example, a party to whom the tenant delivers printed matter that is printed by using the information processing apparatus 200 or a party to whom the tenant outsources work relating to the printed matter that is printed by using the information processing apparatus 200.

The value of the item "management code" is associated with the business partner name and is assigned to a job executed by the information processing apparatus 200.

FIG. 4 illustrates an example of the code management information of the tenant identified by the tenant ID "101". In this code management information, the business partners of the tenant are Company A and Company B. In FIG. 4, the management code of Company A is "1234" and the management code of Company B is "5678". The management code is an example of management information used by a user to identify a business partner. For example, the management code is four or more alphanumeric characters but not limited thereto.

FIG. 5 is a diagram illustrating an example of a display setting database. The display setting information stored in the display setting database 330 according to the present embodiment is provided for each tenant, and information items of the tenant ID, display/hide, and the input method are associated with each other in the information.

The value of the item "display/hide" indicates whether the input screen for inputting the management code is to be displayed. That is, the value of the item "display/hide" indicates whether a management code is to be assigned to a job in the information processing apparatus 200.

The value of "input method" indicates, for example, the method of how to input the management code on the input screen of the management code. Specifically, the value of the item "input method" includes a method of selecting the management code from a list of all management codes stored in the code management database 320, a method of selecting the management code from a list of management codes input during a predetermined time period extending back from the present time, and a method of confirming the management code input last that is displayed in in the input screen.

In FIG. 5, for the tenant identified by the tenant ID "101", a setting is made to display the screen for inputting the management code, and the method for inputting the management code is "input history". Accordingly, in the present embodiment, when the information processing apparatus 200 is used for the tenant specified by the tenant ID "101", a list of a plurality of management codes input during a predetermined period extending back from the present time is displayed on the input screen of the management code.

FIG. 6 is a diagram illustrating an example of a log database. The log information stored in the log database 340 of the present embodiment is stored for each tenant. The log information includes information items of a tenant ID, a management code, and a number of output sheets in association with each other. The value of the item "number of output sheets" is the number of sheets of printed matter delivered to the business partner identified by the management code.

In FIG. 6, the number of output sheets is used as an example of log information, but the log information is not limited thereto. The log information may include items other than those illustrated in FIG. 6. Specifically, for example, log information may include a history of sending and receiving a fax as instructed by the business partner or the number of times a document was scanned. Information on the output setting of printed matter may include information such as the color/monochrome setting, the document size, the aggregated printing setting, and whether stapling is to be performed. Further, information such as the execution date and time of a print job and the user who executed the print job may be stored in association with each other for each print job. That is, in the log database, information in which management code is associated with the job type and the job setting can be stored for each job executed by the information processing apparatus 200.

Figure 7:
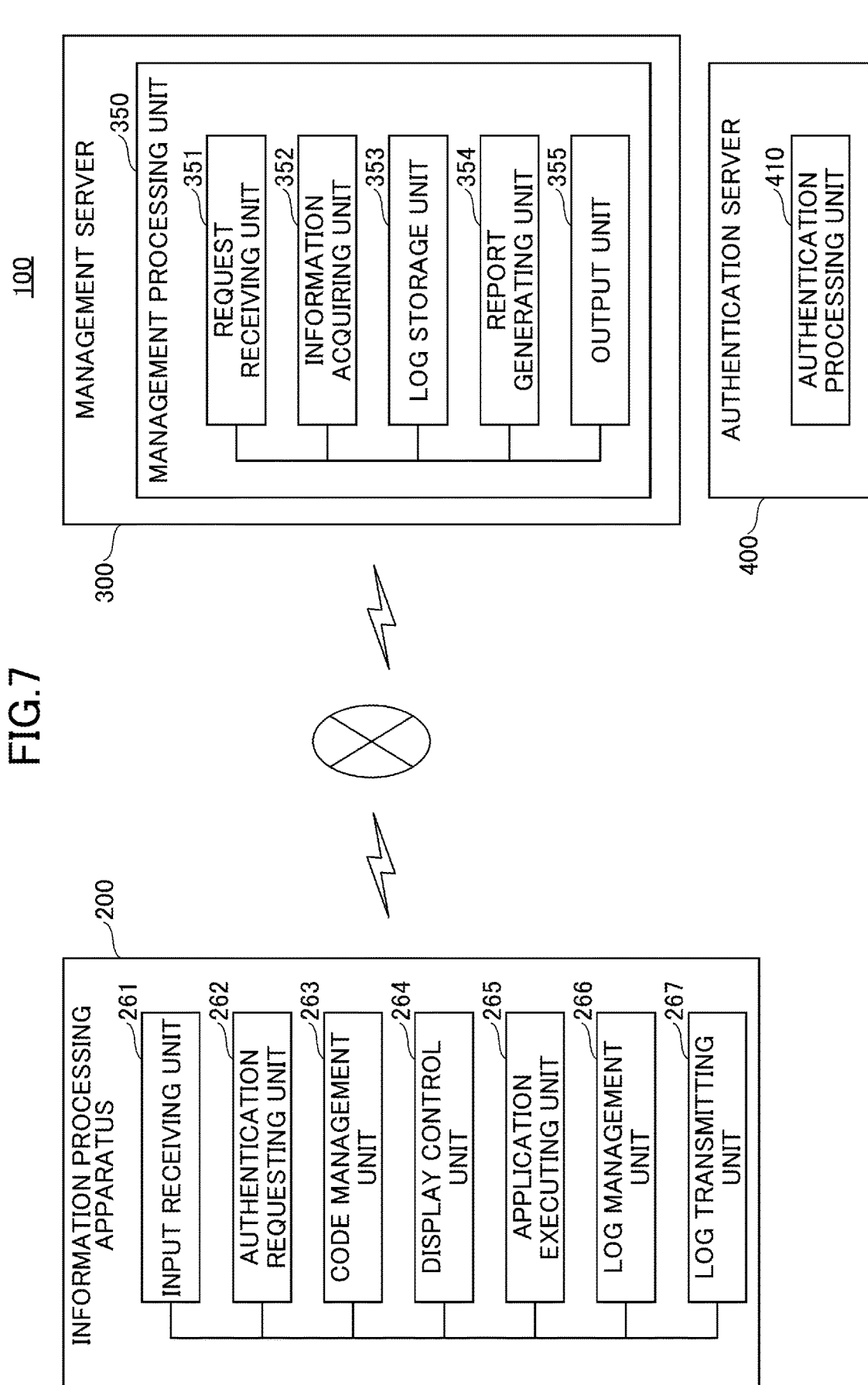
FIG. 7 is a diagram explaining the functions of each apparatus included in an information processing system according to an embodiment of the present invention.

Next, the functional configuration of each apparatus of the information processing system 100 according to the present embodiment will be described with reference to FIG. 7. FIG. 7 is a diagram illustrating the functions of each apparatus included in the information processing system.

First, the functions of the information processing apparatus 200 will be described. Each unit illustrated in FIG. 7 is implemented as the CPU 201 of the information processing apparatus 200 reads out the program stored in the MEM-P 202 and executes the program.

The information processing apparatus 200 according to the present embodiment includes an input receiving unit 261, an authentication requesting unit 262, a code management unit 263, a display control unit 264, an application executing unit 265, a log management unit 266, and a log transmitting unit 267.

The input receiving unit 261 receives various inputs to the operation panel 240 of the information processing apparatus 200. When the input receiving unit 261 receives the input of the authentication information, the authentication requesting unit 262 transmits the authentication information together with an authentication request to the authentication server 400.

The code management unit 263 manages the assignment of a code to a job. Specifically, the code management unit 263 identifies the display/hiding of the input screen of the management code or the method of inputting the management code by referring to the display setting database 330. The code management unit 263 assigns the input management code to the job.

The display control unit 264 controls the display in the operation panel 240. Specifically, the display control unit 264 displays an input screen of the authentication information, an input screen of the management code, a home screen, or the like on the operation panel 240.

The application executing unit 265 executes an application according to an operation. Specifically, the application executing unit 265 executes applications by which a document box function, a copy function, a printer function, a facsimile function, and a scan function are respectively implemented according to an operation of the operation panel 240. These applications are installed in the information processing apparatus 200.

That is, each of the one or more applications is supported by the application executing unit 265. When a desired function is executed, the application executing unit 265 can generate log information. However, the present embodiment is not limited as such, and the application may be a web application. In this case, the information processing apparatus may display an application icon having a Uniform Resource Locater (URL) on the operation panel 240. When the user operates the application icon, the desired function can be executed by accessing an external server based on the URL. In this case, the application executing unit 265 may generate the log information, or the application executing unit 265 may acquire the log information generated by an external server.

The log management unit 266 manages the log information. Specifically, the log management unit 266 determines whether a management code is assigned to the job, and when a job management code is assigned to the job, a management code is assigned to the log information. The log transmitting unit 267 transmits the log information to the management server 300.

Next, the management server 300 will be described. The management server 300 according to the present embodiment includes a request receiving unit 351, an information acquiring unit 352, a log storage unit 353, a report generating unit 354, and an output unit 355.

The request receiving unit 351 receives various requests from the information processing apparatus 200. The information acquiring unit 352 acquires information according to a request to the information processing apparatus 200. The log storage unit 353 stores the log information received from the information processing apparatus 200 in the log database 340. The report generating unit 354 generates report information in which the log information is aggregated by referring to the log database 340 in response to a request received by the request receiving unit 351. The output unit 355 outputs various kinds of information.

Next, the authentication server 400 will be described. The authentication server 400 according to the present embodiment includes an authentication processing unit 410.

When the authentication processing unit 410 receives authentication information from the information processing apparatus 200, the authentication processing unit 410 determines whether information matching the authentication information is present by referring to a storage unit in which the information related to the user of the information processing system 100 is stored and transmits the authentication result to the information processing apparatus 200.

Specifically, the authentication processing unit 410 determines that authentication of a user identified by the authentication information is successful, when the corresponding information is present in the storage unit. When there is no corresponding information in the storage unit, the authentication processing unit 410 determines that the authentication of the user is unsuccessful.

Figure 8:
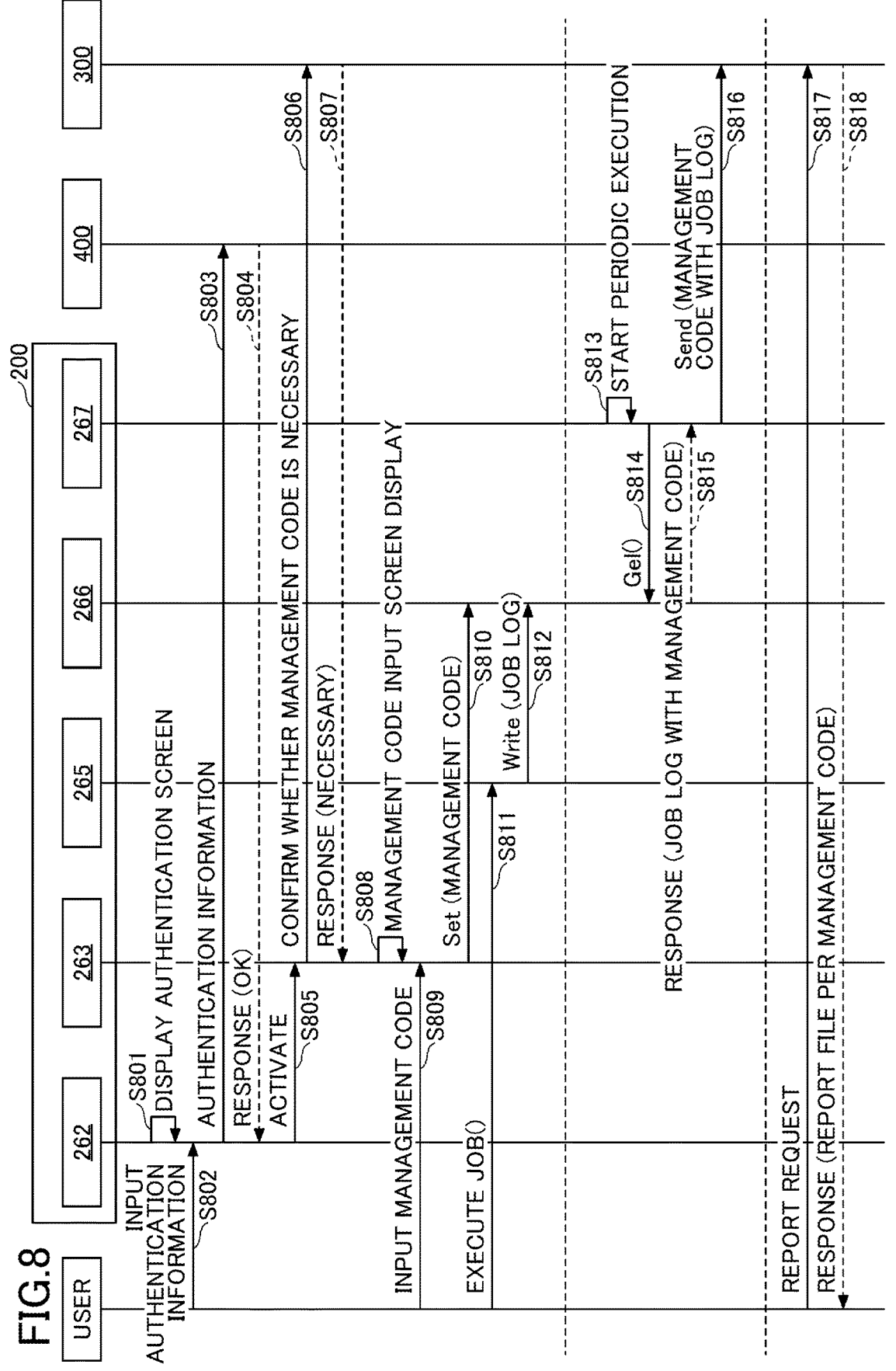
FIG. 8 is a sequence diagram illustrating an operation of an information processing system according to an embodiment of the present invention.

Next, an operation of the information processing system 100 according to the present embodiment will be described with reference to FIG. 8. FIG. 8 is a sequence diagram illustrating an operation of an information processing system.

In the information processing system 100 according to the present embodiment, in step S801, the authentication requesting unit 262 of the information processing apparatus 200 displays the authentication screen for inputting the authentication information on the operation panel 240 by the display control unit 264.

Subsequently, in step S802, when the authentication requesting unit 262 receives the input of the authentication information by the input receiving unit 261, the information processing apparatus 200 transmits the authentication information to the authentication server 400 together with an authentication request (step S803). The authentication information of the present embodiment includes a tenant ID. In addition to the tenant ID, the authentication information of the present embodiment may include a user ID (user identification information) and a password that identify a user belonging to a company or the like identified by the tenant ID. However, the authentication information may be any information for identifying an organization, a user, or a device that is the subject that uses the functions of the information processing apparatus 200 or the services provided by an external server via the information processing apparatus 200. Thus, the authentication information may suffice as long as the authentication information includes any one of a tenant ID, a user ID, a device ID, or a password. That is, the tenant ID, the user ID, the device ID, and the password are included in the identification information identifying the subject requesting the execution of the service provided by the information processing system 100.

Further, the input of the authentication information may be done by methods other than the input to the authentication screen. Specifically, for example, the authentication information is stored in a portable recording medium such as an integrated circuit (IC) card, and the information processing apparatus 200 may obtain the authentication information by reading the authentication information stored in the recording medium.

In step S804, the authentication server 400 receives the authentication request and returns the authentication result to the information processing apparatus 200. Here, it is assumed that the user authentication is successful. The authentication result may include a tenant ID of the tenant to which the user belongs or information for accessing the management server 300.

In the information processing apparatus 200, when authentication is successful, in step S805, the authentication requesting unit 262 activates the code management unit 263.

Subsequently, in step S806, the code management unit 263 transmits a request for confirming the necessity of a management code to the management server 300. That is, the code management unit 263 transmits, to the management server 300, a confirmation request of whether it is necessary to input a management code to the input screen of the management code. Specifically, the code management unit 263 transmits the tenant ID included in the authentication information or the tenant ID acquired from the authentication server 400, to the management server 300 together with the confirmation request. The confirmation request may include information for accessing the management server 300 as information related to the authentication result obtained from the authentication server 400.

The management server 300 receives the confirmation request and acquires, by the information acquiring unit 352, the display setting information corresponding to the tenant ID received together with the confirmation request, from among the display setting information stored in the display setting database 330. In step S807, the management server 300 transmits the display setting information to the information processing apparatus 200. Here, it is assumed that the value of the item "display/hide" of the display setting information is "display".

The management server 300 may transmit the code management information included in the code management database 320 to the information processing apparatus 200 as information corresponding to the tenant ID received along with the confirmation request. However, the management server 300 may determine whether to transmit the code management information based on the display setting information. For example, when the value of "display/hide" of the display setting information is "display" and the display method is "input history", the code management information can be transmitted.

The code management unit 263 determines whether to cause the screen for inputting the management code to be displayed based on the display setting information. Here, in step S808, the code management unit 263 receives the display setting information, and the display control unit 264 causes the operation panel 240 to display an input screen of the management code. At this time, the display control unit 264 displays an input screen corresponding to the value of the item "input method" in the display setting information. On the other hand, if the value of the item "display/hide" of the display setting information is "hide", the home screen can be displayed on the operation panel 240 without displaying the input screen of the management code.

Subsequently, in step S809, when the input receiving unit 261 receives the input of the management code, the code management unit 263 sets the management code to the log management unit 266 (step S810). In setting the management code, the code management unit 263 may request code related information related to all of the code management information or related to the input code, to the management server 300.

At this time, the information processing apparatus 200 may cause the display of the operation panel 240 to transition from the input screen of the management code to the home screen.

Subsequently, in step S811, the information processing apparatus 200 receives an instruction to execute the job by the selected application. Specifically, the information processing apparatus 200 receives the selection of the application to be executed from a list of applications displayed on the home screen.

In step S812, when the application is selected, the application executing unit 265 executes the job corresponding to the selected application and writes the log information to the log management unit 266. At this time, in the log management unit 266, the management code transferred to the log management unit 266 in step S810 is assigned to the log information. In this case, the application executing unit 265 does not need to assign a management code, and, therefore, the process of reporting and setting the management code for each application by the code management unit 263 can be omitted.

The input management code may be transferred to the application executing unit 265. That is, the code management unit 263 reports and sets the management code for each application. In this case, when writing the log information or generating the log information, the application executing unit 265 can write the log information to the log management unit after assigning the management code to the log information.

The above-described process is performed until the information processing apparatus 200 acquires the log information. Next, a process of transmitting the log information from the information processing apparatus 200 to the management server 300 will be described.

In step S813, the information processing apparatus 200 starts the transmission process of the log information by the log transmission unit 267, and makes an acquisition request of the log information to the log management unit 266 (step S814). The transmission process of the log information can be started at any time. For example, the transmission process of the log information can be started at a predetermined time and date, at every predetermined time, at the time of activating or shutting down the information processing apparatus, or at the time of login or logout of the user.

In step S815, the log management unit 266 returns the log information having the management code assigned thereto to the log transmission unit 267 in response to the acquisition request. In step S816, the log transmission unit 267 transmits the log information to which the management code is assigned, to the management server 300. The management server 300 stores the received log information in the log database 340.

The above is the process of transmitting log information. Next, the process of outputting report information will be described.

In step S817, the management server 300 receives a request for acquiring report information through a user terminal such as a PC. At this time, in the information processing system 100, when the input of the authentication information is received again by the information processing apparatus 200 and authentication is successful, the information processing apparatus 200 may transmit the tenant ID together with the request for acquiring a report to the management server 300.

In step S818, when the management server 300 receives the request for acquiring report information, the management server 300 acquires log information corresponding to the tenant ID from the log database 340, and outputs the aggregate result of the log information for each management code to the information processing apparatus 200.

The report information according to the present embodiment may be output in any format as long as the log information is aggregated for each management code. That is, the report information may be in any format that enables the identification of the usage amount of the information processing apparatus 200 for each business partner of the tenant identified by the tenant ID, and the report information may be displayed on the operation panel 240 of the information processing apparatus 200.

In FIG. 8, steps S801 to S812 (processing until the log information is acquired), steps S813 to S816 (processing for transmitting the log information), and steps S817 and S818

(processing for outputting a report) may be performed independently at different timings.

Further, according to the present embodiment, the process of transmitting the log information may be executed after the execution of the job, that is, immediately after step S812. In this case, the log information is transmitted to the management server 300 each time a job is executed.

Further, according to the present embodiment, logout processing may be executed after executing the job or when a logout request is received from a user. Further, the information processing apparatus 200 may automatically execute a logout process when an operation is not received for a certain period of time.

At this time, the code management unit 263 cancels the setting of the input management code. Specifically, the code management unit 263 erases the management code set in the log management unit 266 in step S810.

In this manner, when the information processing apparatus 200 is used by a plurality of tenants, the management code associated with one tenant is prevented from being unintentionally associated with the log information of another tenant.

In the present embodiment, the authentication information is input to the authentication screen, and the screen for inputting the management code is displayed immediately after the authentication is performed. However, the present invention is not limited thereto. The management code input screen may be displayed at a timing other than immediately after authentication. Specifically, in the present embodiment, for example, the screen may transition from the home screen to the input screen of the management code.

Figure 9:
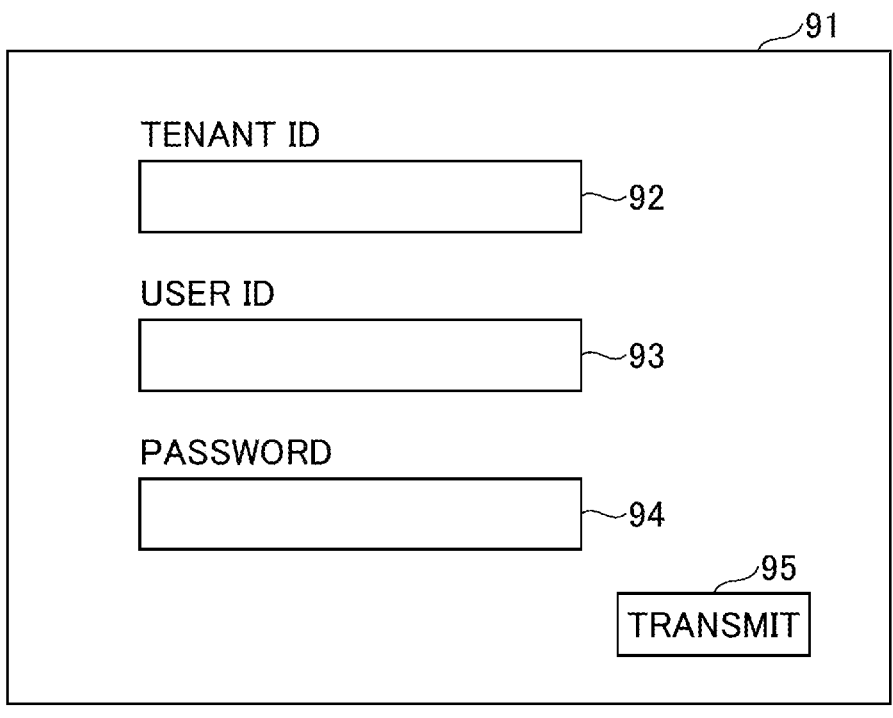
FIG. 9 is a diagram illustrating an example of an authentication screen according to an embodiment of the present invention.

Next, a display example in the information processing apparatus 200 according to the present embodiment will be described with reference to FIGS. 9 to 12. FIG. 9 is a diagram illustrating an example of an authentication screen. A screen 91 illustrated in FIG. 9 is an example of an authentication screen displayed on the operation panel 240 of the information processing apparatus 200 in step S801 of FIG. 8.

On the screen 91, input fields 92, 93, and 94 and an operation button 95 are included. The input field 92 is a tenant ID input field, the input field 93 is a user ID input field, and the input field 94 is a password input field. The operation button 95 is an operation button for transmitting the information input to the input fields 92, 93, and 94 as the authentication information, to the authentication server 400. An operation button specifying whether to omit the management code input screen may be included. If such a button is operated, even if the authentication is successful, the display of the management code input screen may be omitted and the screen may immediately transition to the home screen.

The information processing apparatus 200 transmits the authentication information to the authentication server 400 when the authentication information is input in the input fields 92, 93, and 94 and the operation button 95 is operated.

In the example of FIG. 9, a user ID and a password are to be input as the authentication information, but the authentication information is not limited thereto. The authentication information of the present embodiment may be, for example, only the tenant ID.

Figure 10:
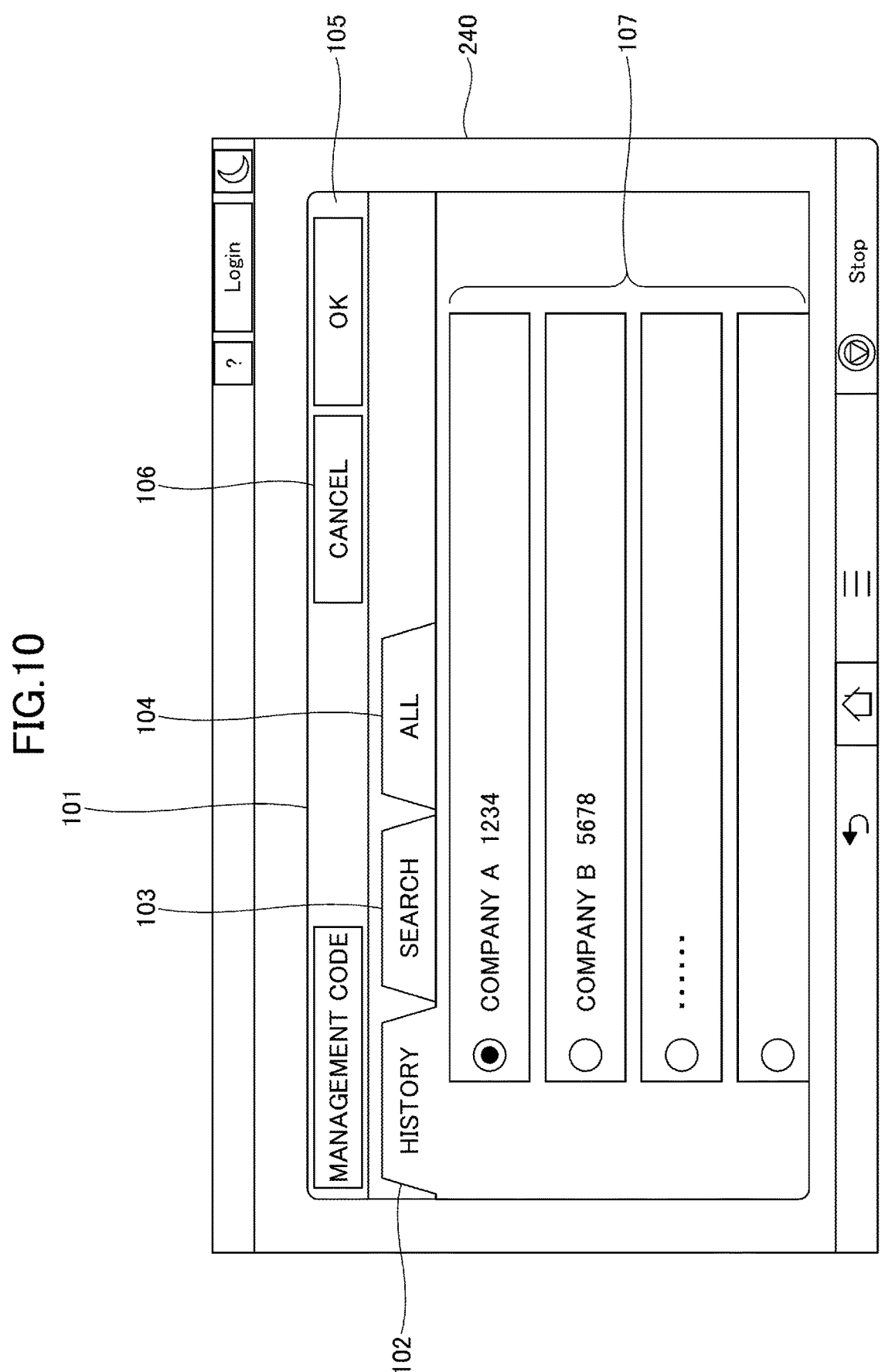
FIG. 10 is a first diagram illustrating an example of an input screen of a management code according to an embodiment of the present invention.

Next, the screen for inputting the management code will be described with reference to FIGS. 10 and 11. FIG. 10 is a first diagram illustrating an example of the input screen of the management code.

A screen 101 illustrated in FIG. 10 is an example of an input screen of the management code displayed on the operation panel 240 in step S808 of FIG. 8.

In the screen 101, tabs 102, 103, and 104 and operation buttons 105 and 106 are included. The tabs 102, 103, and 104 each correspond to a method of inputting a management code.

In the example of FIG. 10, the tab 102 is associated with a method of making a selection from a list of management codes that have been input during a predetermined time period extending back from the present time. The tab 103 is associated with a method of searching and inputting a desired management code from the code management database 320. In this case, among the management codes previously registered in the code management database, the management codes including the code input by the user may be listed as candidates. The tab 104 is associated with a method for making a selection from a list of all management codes stored in the code management database 320. The display of the screen 101 can be switched based on the input method included in the display setting information. For example, the tab corresponding to the input method included in the display setting information may be displayed first, or only the tab corresponding to the input method included in the display setting information may be displayed and the other tabs may be hidden.

On the screen 101, the method for inputting the management code can be switched by selecting these tabs. The tabs displayed on the input screen of the management code are not limited to those illustrated in FIG. 10. The input screen of the management code may include tabs other than those illustrated in FIG. 10, which may be associated with input methods other than the input methods associated with the tabs illustrated in FIG. 10.

In the example of FIG. 10, the tab 102 is selected and a management code list 107 of a plurality of management codes that have been input during a predetermined time period extending back from the present time are displayed. In the management code list 107, the name of the business partner can be displayed for each management code. In the example of FIG. 10, "Company A 1234" is selected from this list.

In the present embodiment, when one management code is selected, the display of the other management code may be grayed out. If another management code is selected, the previously selected management code may be automatically canceled.

When the management code is selected and the operation button 105 is operated on the screen 101, the information processing apparatus 200 assigns the selected management code to the log information.

In the present embodiment, when the operation button 106 is operated, the display of the operation panel 240 may transition from the screen 101 for inputting the management code to the home screen without receiving input of the management code input.

The case in which the input of the management code is not received is, for example, a case in which the management code is not required when the information processing apparatus 200 is used for the tenant. Specifically, there are cases where users belonging to the organization that is the tenant print documents for their personal purposes.

As described above, in the present embodiment, even when the display setting information is set to display the input screen of the management code, the information processing apparatus 200 can execute the job without inputting the management code.

Figure 11:
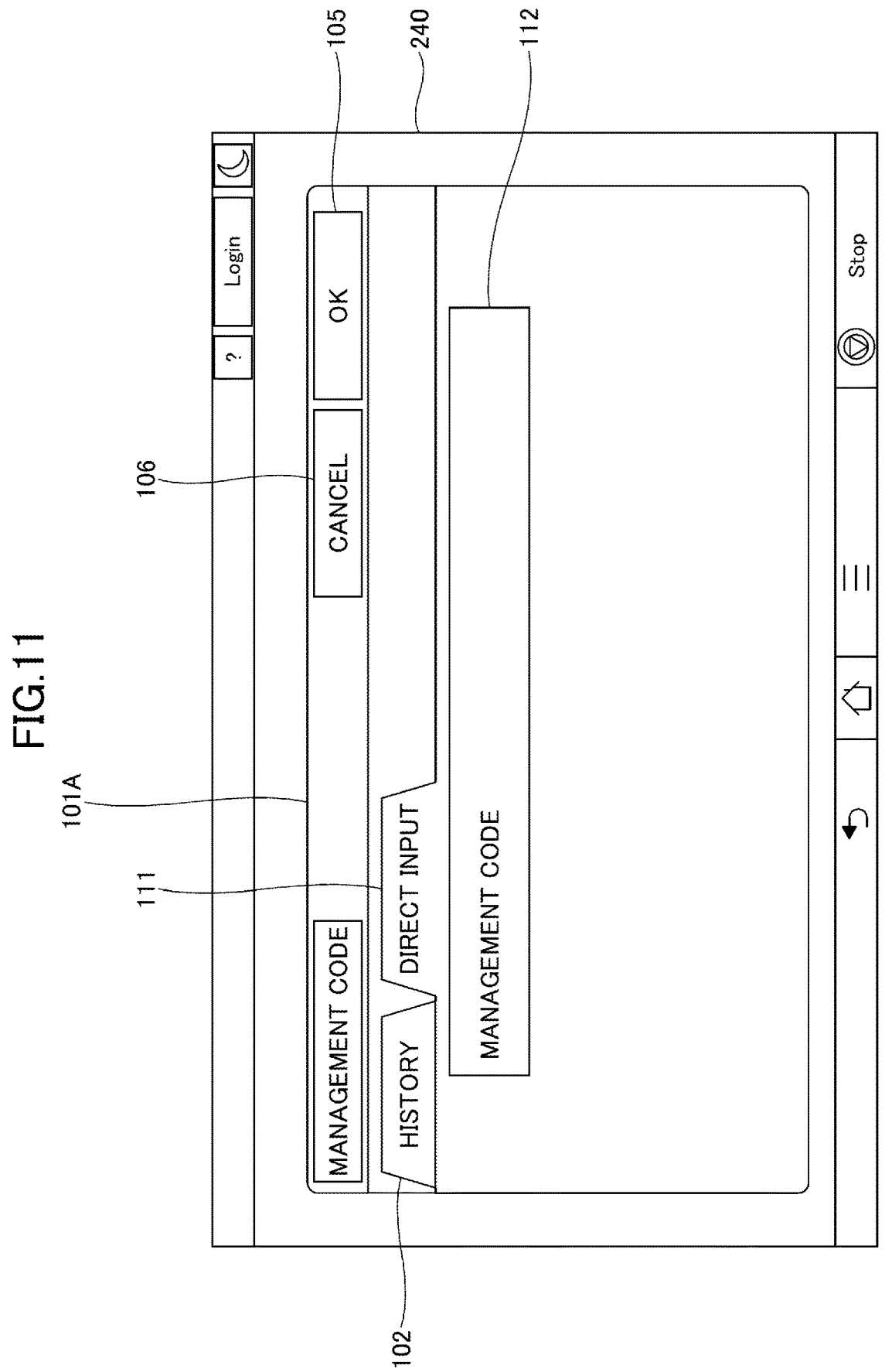
FIG. 11 is a second diagram illustrating an example of an input screen of a management code according to an embodiment of the present invention.

FIG. 11 is a second diagram illustrating an example of the input screen of the management code. In a screen 101A illustrated in FIG. 11, the tab 102, a tab 111, and the operation button 105 are included. Although illustrated separately from FIG. 10, the tab 111 may be included on the screen 101.

The tab 111 is associated with a method of directly inputting a management code, such as by a virtual keyboard.

On the screen 101A, the tab 111 is selected and an input field 112 is displayed. When the operation button 105 is operated after the management code is input to the input field 112, the information processing apparatus 200 assigns the input management code to the log information.

Here, in the method of directly inputting the management code, the user can specify a management code that is not previously registered in the code management database. When the user inputs the management code, if the input management code matches the management code previously registered in the code management database, a matching management code may be displayed as a candidate. Among the management codes previously registered in the code management database, the management codes including the code input by the user may be displayed as candidates. This prevents confusion with another management code already registered in the code management database.

According to the present embodiment, the management code to be preferentially used may be determined according to the method of inputting the management code.

Specifically, for example, as illustrated in FIG. 11, the directly input management code may be prioritized over the management code selected from the list illustrated in FIG. 10, and the prioritized management code may be set to the log management unit 266.

In this manner, for example, in the case of temporarily setting a new management code, the management code can be set without performing processing such as adding new code management information to the code management database 320, and thus labor of the system administrator or the like can be reduced.

Figure 12:
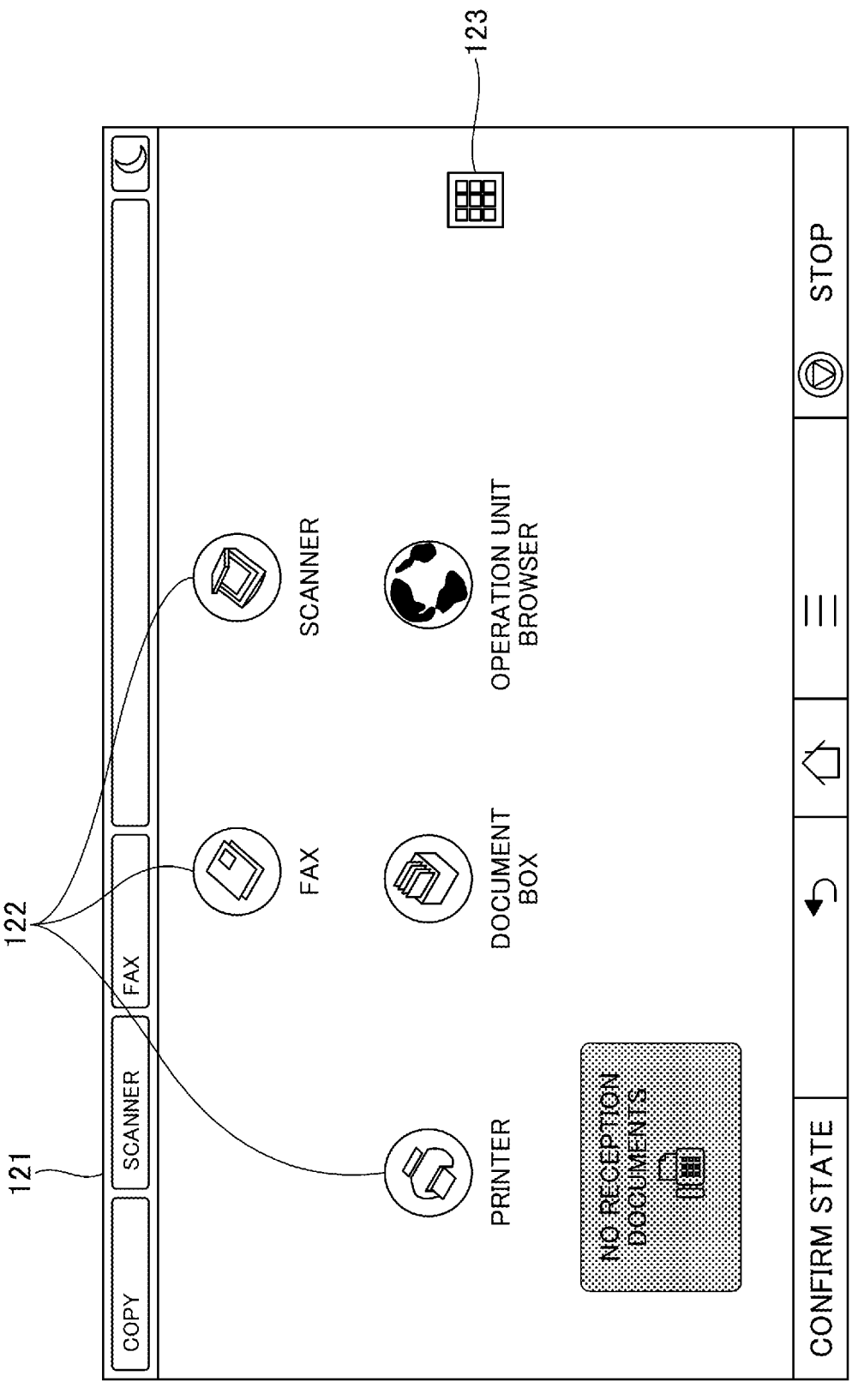
FIG. 12 is a diagram illustrating an example of a home screen of an information processing apparatus according to an embodiment of the present invention.

Next, the home screen of the information processing apparatus 200 according to the present embodiment will be described with reference to FIG. 12. FIG. 12 is a diagram illustrating an example of a home screen of an information processing apparatus.

A screen 121 illustrated in FIG. 12 is an example of the home screen displayed on the operation panel 240 after step S808 in FIG. 8.

The screen 121 includes an icon group 122 corresponding to applications for implementing the functions provided by the information processing apparatus 200, and an operation button 123. When a user operations an icon, the application that is the operation target can be activated to execute the job for the desired function. That is, the home screen is an example of the function selection screen, and a list of the functions of the information processing apparatus 200, such as printing, scanning, copying, and faxing, is displayed in a selectable manner.

The list of icons of the icon group 122 is displayed on the screen 121. In the present embodiment, when the operation button 123 is operated, the operation components for causing the screen 121 to transition to the input screen of the management code may be displayed.

As described above, according to the present embodiment, by causing the home screen to transition to the input screen of the management code, it is not necessary to input the authentication information each time a management code is changed, and the input work can be simplified.

In the present embodiment, the display setting information is set for each tenant, but is not limited thereto. For example, the display setting information may be set for each user belonging to the organization that is a tenant. In this case, the display setting information includes the user ID and password in addition to the tenant ID. As described above, by setting the display setting information for each user, it is possible to set the display/hiding of the input screen of the management code or the input method of the management code for each user. In this case, the code management unit 263 can transmit a message confirming the necessity of the management code including the user ID to the management server and acquire the display setting information corresponding to the user ID.

Further, the display setting information may be set for each information processing apparatus 200, for example. In this case, in addition to the tenant ID, the display setting information includes a device ID (device identification information) for identifying the information processing apparatus 200. As described above, by setting the display setting information for each information processing apparatus 200, it is possible to set the display/hiding of the input screen of the management code and the input method of the management code for each information processing apparatus 200. In this case, the code management unit 263 can transmit a message confirming the necessity of the management code including the device ID to the management server and acquire the display setting information corresponding to the device ID.

Further, in the present embodiment, when multiple types of display setting information exist, for example, display setting information per tenant, display setting information per user, display setting information per information processing apparatus 200, or the like, the order of priority of the display setting information to be referred to may be voluntarily set. In this manner, the display setting information to be prioritized can be appropriately changed according to the industry of the tenant, the job type of the user, the environment in which the information processing apparatus 200 is set, and the like. In this case, the management server 300 receives the access from the administrator through the administrator terminal and receives the setting of the priority order in which the display setting information is to be referred.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

Also, the apparatus group described in the examples are merely indicative of one of a plurality of computing environments for carrying out the embodiments disclosed herein.

In some embodiments, the management server 300 and the authentication server 400 include a plurality of computing devices, such as server clusters. The plurality of computing devices are configured to communicate with each other via any type of communication link, including networks, a shared memory, and the like, and perform the processes disclosed herein. Similarly, the management server 300 and the authentication server 400 may include a plurality of computing devices configured to communicate with each other.

Further, the management server 300 and the authentication server 400 may be configured to share various combinations of disclosed processing steps. For example, the process performed by the management server 300 and the authentication server 400 may be performed by other server apparatuses. Similarly, the functions of the management server 300 and the authentication server 400 may be performed by other server apparatuses. The elements of the server apparatus and other server apparatuses may be grouped into a single server apparatus or may be divided into a plurality of apparatuses.

The information processing apparatus 200 is not limited to an image forming apparatus as long as a communication function is included. The information processing apparatus 200 may be, for example, a Projector (PJ), an Interactive White Board (IWB, a whiteboard having a blackboard function capable of mutual communication), an output device such as a digital signage, a Head Up Display (HUD) device, an industrial machine, an imaging device, a sound collector, a medical device, a network appliance, a connected car, a notebook personal computer (PC), a mobile phone, a smartphone, a tablet terminal, a game machine, a Personal Digital Assistant (PDA), a digital camera, a wearable PC, a desktop PC, and the like.

According to one embodiment of the present invention, the input operation can be simplified.

The information processing apparatus, the information processing method, and the recording medium are not limited to the specific embodiments described in the detailed description, and variations and modifications may be made without departing from the spirit and scope of the present invention.

What is claimed is:

1. An image forming apparatus comprising:
circuitry; and
a memory storing computer-executable instructions that cause the circuitry to execute:
accepting user authentication information for access to the image forming apparatus;
receiving input of identification information for identifying a user requesting execution of a service, and associating a management code with the identification information;
displaying, on a display, an input screen for inputting the management code;
receiving input of the management code from the input screen;
outputting, to an external server, an authentication request to authenticate the identification information, and wherein the displaying includes displaying the input screen for inputting the management code, in response to determining that the user has been authenticated based on the identification information, and confirming that the management code is necessary;
wherein the displaying includes displaying the input screen for inputting the management code at a timing that is immediately after the identification information is authenticated in response to the authentication request and before a function selection screen is displayed;
transitioning, after receiving the input of the management code from the input screen, to the function selection screen that displays a function in a selectable manner, the function selection screen displaying the function in a list of functions to be selected from;

executing a job after receiving the input of the management code by selecting the function to be executed from the function selection screen;

assigning the management code to the job executed by selecting the function from the function selection screen, the input of the management code being performed before the function is selected from the function selection screen;

writing log information indicating execution history of the job executed after receiving the input of the management code, the log information including the execution history of the job by the selected function, and the management code assigned to the execution history of the job by the selected function; and canceling the assigning of the management code to the job when a logout process for the user is executed.

2. The image forming apparatus according to claim 1, wherein the input screen for inputting the management code is a screen corresponding to display setting information associated with identification information for identifying a subject requesting execution of a service.

3. The image forming apparatus according to claim 2, wherein an instruction to change an input method for inputting the management code is received at the input screen for inputting the management code, and the display setting information includes information indicating the input method.

4. The image forming apparatus according to claim 2, wherein the display setting information includes information indicating an input method, and the input method includes a method of selecting the management code from a list of all management codes associated with the identification information, a method of selecting the management code from a list of a plurality of management codes that have been input during a predetermined period extending backwards in time, a method of confirming the management code most recently input in the input screen, and a method of inputting the management code in an input field displayed on the display.

5. The image forming apparatus according to claim 2, wherein the display setting information includes information indicating whether to display or hide the input screen for inputting the management code, in response to determining that the subject has been authenticated based on the identification information.

6. The image forming apparatus according to claim 2, wherein the identification information includes tenant identification information for identifying a tenant, user identification information for identifying a user belonging to the tenant, and device identification information for identifying the image forming apparatus.

7. The image forming apparatus according to claim 6, wherein the display setting information is associated with the tenant identification information and the user identification information, and wherein the receiving includes receiving authentication information including the tenant identification information and the user identification information, and the displaying includes displaying, on the display, the input screen for inputting the management code according to the display setting information in which the tenant identification information and the user identification information are associated with each other, in response to determining that the user identification information has been authenticated.

8. The image forming apparatus according to claim 6, wherein the display setting information is associated with the device identification information for identifying the image forming apparatus managed by the tenant, and wherein the displaying includes displaying, on the display, the input screen for inputting the management code according to the display setting information in which the tenant identification information and the device identification information are associated with each other, in response to determining that the tenant identification information has been authenticated.

9. The image forming apparatus according to claim 1, wherein the circuitry is further caused to execute:

receiving display setting information indicating a display setting relating to the management code of the user for indicating whether the input screen for inputting the management code is to be displayed; and determining the displaying of the management code on the input screen based on the display setting information.

10. An image forming method performed by an image forming system including an image forming apparatus and a server, image forming method comprising:

accepting user authentication information for access to the image forming apparatus;

receiving input of identification information for identifying a user requesting execution of a service, and associating a management code with the identification information;

displaying, on a display by the image forming apparatus, an input screen for inputting the management code;

receiving, by the image forming apparatus, input of the management code from the input screen;

outputting, to an external server, an authentication request to authenticate the identification information, and wherein the displaying includes displaying the input screen for inputting the management code, in response to determining that the user has been authenticated based on the identification information, and confirming that the management code is necessary;

wherein the displaying includes displaying the input screen for inputting the management code at a timing that is immediately after the identification information is authenticated in response to the authentication request and before a function selection screen is displayed;

transitioning, by the image forming apparatus, after receiving the input of the management code from the input screen, to the function selection screen that displays a function in a selectable manner, the function selection screen displaying the function in a list of functions to be selected from;

executing, by the image forming apparatus, a job after receiving the input of the management code by selecting the function to be executed from the function selection screen;

assigning the management code to the job executed by selecting the function from the function selection screen, the input of the management code being performed before the function is selected from the function selection screen;

writing, by the image forming apparatus, log information indicating execution history of the job executed after receiving the input of the management code, the log information including the execution history of the job by the selected function, and the management code assigned to the execution history of the job by the selected function;

transmitting, to the server by the image forming apparatus, the log information associated with the management code; and canceling the assigning of the management code to the job when a logout process for the user is executed.

11. A non-transitory computer-readable recording medium storing a program that causes a computer to execute a process performed in an image forming apparatus, the process comprising:

accepting user authentication information for access to the image forming apparatus;

receiving input of identification information for identifying a user requesting execution of a service, and associating a management code with the identification information;

displaying, on a display, an input screen for inputting the management code;

receiving input of the management code from the input screen;

outputting, to an external server, an authentication request to authenticate the identification information, and wherein the displaying includes displaying the input screen for inputting the management code, in response to determining that the user has been authenticated based on the identification information, and confirming that the management code is necessary;

wherein the displaying includes displaying the input screen for inputting the management code at a timing that is immediately after the identification information is authenticated in response to the authentication request and before a function selection screen is displayed;

transitioning, after receiving the input of the management code from the input screen, to the function selection screen that displays a function in a selectable manner, the function selection screen displaying the function in a list of functions to be selected from;

executing a job after receiving the input of the management code by selecting the function to be executed from the function selection screen;

assigning the management code to the job executed by selecting the function from the function selection screen, the input of the management code being performed before the function is selected from the function selection screen;

writing log information indicating execution history of the job executed after receiving the input of the management code, the log information including the execution history of the job by the selected function, and the management code assigned to the execution history of the job by the selected function; and canceling the assigning of the management code to the job when a logout process for the user is executed.

* * * * *